(12) United States Patent
Terauchi

(10) Patent No.: US 11,817,593 B2
(45) Date of Patent: Nov. 14, 2023

(54) POWER SUPPLY DEVICE AND VEHICLE PROVIDED WITH POWER SUPPLY DEVICE

(71) Applicant: SANYO Electric Co., Ltd., Daito (JP)

(72) Inventor: Shinobu Terauchi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 399 days.

(21) Appl. No.: 16/981,724

(22) PCT Filed: Nov. 16, 2018

(86) PCT No.: PCT/JP2018/042378
§ 371 (c)(1),
(2) Date: Sep. 17, 2020

(87) PCT Pub. No.: WO2019/187314
PCT Pub. Date: Oct. 3, 2019

(65) Prior Publication Data
US 2021/0376418 A1 Dec. 2, 2021

(30) Foreign Application Priority Data
Mar. 30, 2018 (JP) .................................. 2018-069572

(51) Int. Cl.
*H01M 50/238* (2021.01)
*H01M 50/209* (2021.01)
(Continued)

(52) U.S. Cl.
CPC ........... *H01M 50/238* (2021.01); *B60L 50/64* (2019.02); *H01M 50/209* (2021.01);
(Continued)

(58) Field of Classification Search
CPC ............. H01M 50/238; H01M 50/209; H01M 50/242; H01M 50/264
See application file for complete search history.

(56) References Cited

U.S. PATENT DOCUMENTS

| 5,766,801 A | 6/1998 | Inoue et al. |
| 2007/0026305 A1* | 2/2007 | Jeon ................... H01M 50/209 |
| | | 429/159 |

(Continued)

FOREIGN PATENT DOCUMENTS

| JP | 9-120808 A | 5/1997 |
| JP | 2007-073509 A | 3/2007 |

(Continued)

OTHER PUBLICATIONS

International Search Report dated Feb. 12, 2019, issued in counterpart application No. PCT/JP2018/042378 (2 pages).

*Primary Examiner* — Jonathan G Jelsma
(74) *Attorney, Agent, or Firm* — WHDA, LLP

(57) ABSTRACT

A power supply device includes: a plurality of secondary battery cells; a pair of end plates disposed on end surfaces of a battery stack obtained by connecting the plurality of secondary battery cells to sandwich the battery stack; and a fastening member for fixing the end plates to each other. The end plate includes a first band body protruding from a main surface of the end plate on an upper end side of the end plate and second a band body protruding from the main surface of the end plate in a middle of the end plate. A space is formed in the second band body between the second band body and the main surface of the end plate.

12 Claims, 11 Drawing Sheets

(51) Int. Cl.
 H01M 50/242 (2021.01)
 H01M 50/264 (2021.01)
 H01M 50/224 (2021.01)
 B60L 50/64 (2019.01)
 H01M 50/249 (2021.01)
 H01M 50/291 (2021.01)

(52) U.S. Cl.
 CPC ....... *H01M 50/224* (2021.01); *H01M 50/242* (2021.01); *H01M 50/249* (2021.01); *H01M 50/264* (2021.01); *H01M 50/291* (2021.01); *H01M 2220/20* (2013.01)

(56) References Cited

U.S. PATENT DOCUMENTS

| | | |
|---|---|---|
| 2007/0052390 A1 | 3/2007 | Kim et al. |
| 2011/0064992 A1 | 3/2011 | Kim et al. |
| 2015/0004469 A1 | 1/2015 | Park et al. |
| 2017/0110695 A1 | 4/2017 | Nishikawa et al. |
| 2017/0352850 A1* | 12/2017 | Nagane ............... H01M 50/209 |

FOREIGN PATENT DOCUMENTS

| | | |
|---|---|---|
| JP | 2015-11989 A | 1/2015 |
| JP | 2015-111493 A | 6/2015 |
| JP | 2015-207553 A | 11/2015 |

* cited by examiner

POWER SUPPLY DEVICE AND VEHICLE PROVIDED WITH POWER SUPPLY DEVICE

TECHNICAL FIELD

The present invention relates to a power supply device and a vehicle provided with the power supply device.

BACKGROUND ART

A power supply device is used for driving a vehicle or the like. Such a power supply device is capable of outputting large current by connecting a large number of secondary battery cells in series or in parallel. In recent years, capacity of a secondary battery cell has been increasing, and implementation of measures against heating and burning of the secondary battery cell has become an issue. In particular, since the high capacity secondary battery cell has high battery energy, ensuring safety is important.

In a vehicle-mounted battery system, an assembled battery configured by fastening a plurality of secondary battery cells to end plates with fastening members is used. The end plate with a shape having a plurality of ribs as in PTL 1 is effective in terms of strength and weight reduction.

On the other hand, with the recent increase in the capacity of the secondary battery cell, an expansion amount of the secondary battery cell tends to increase. When the secondary battery cells having such large expansion amounts are fastened to the end plates with the fastening members, stress is concentrated on the end plates, and the end plates may be broken.

CITATION LIST

Patent Literature

PTL 1: Unexamined Japanese Patent Publication No. H09-120808

SUMMARY OF THE INVENTION

The present invention has been made in view of such a background, and an object of the present invention is to provide a power supply device including end plates that can maintain restraint of secondary battery cells while allowing partial deformation of the secondary battery cells, and a vehicle provided with the power supply device.

A power supply device according to one exemplary embodiment of the present invention includes: a plurality of secondary battery cells; a pair of end plates disposed on end surfaces of a battery stack obtained by connecting the plurality of secondary battery cells to sandwich the battery stack, each of the end plates having rigidity at an upper end portion that is higher than rigidity at a central portion; and a fastening member for fixing the end plates to each other.

With the above configuration, expansion of the secondary battery cells located on the end surfaces of the battery stack can be suppressed by the end plates, and the secondary battery cells can be protected.

DESCRIPTION OF EMBODIMENT

Figure 1:
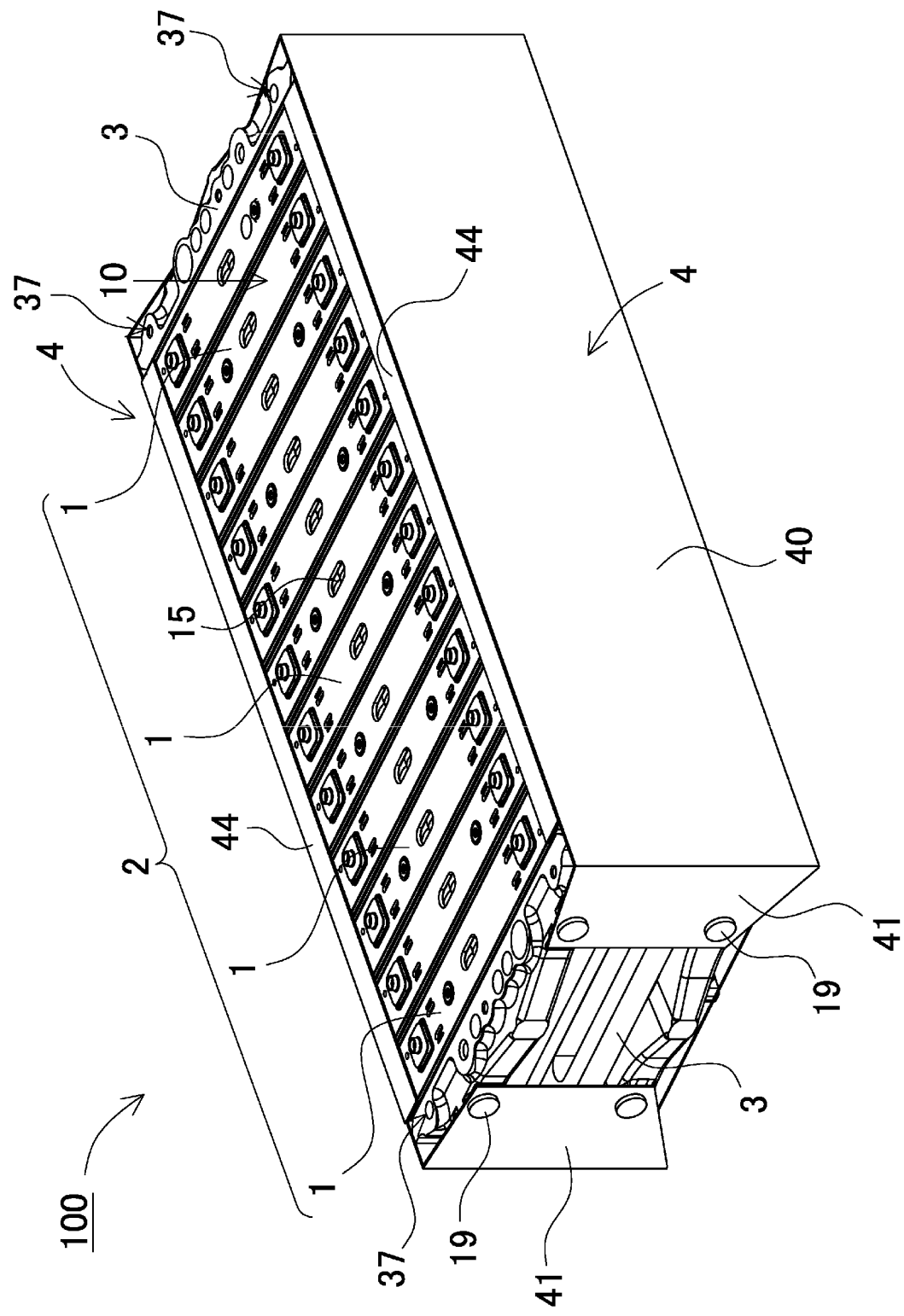
FIG. 1 is a schematic perspective view of a power supply device according to a first exemplary embodiment of the present invention.

A power supply device according to one exemplary embodiment of the present invention includes: a plurality of secondary battery cells; a pair of end plates disposed on end surfaces of a battery stack obtained by connecting the plurality of secondary battery cells to sandwich the battery stack; and a fastening member for fixing the end plates to each other. The end plate includes a first band body protruding from a main surface of the end plate on an upper end side of the end plate, and a second band body protruding from the main surface of the end plate in a middle of the end plate, and a space is formed in the second band body between the second band body and the main surface of the end plate.

According to the above configuration, expansion of the secondary battery cell located on the end surface of the battery stack can be suppressed by the end plate, and this secondary battery cell can be protected.

In addition, a power supply device according to another exemplary embodiment of the present invention includes: a plurality of secondary battery cells; a pair of end plates disposed on end surfaces of a battery stack obtained by connecting the plurality of secondary battery cells to sandwich the battery stack; and a fastening member for fixing the end plates to each other. The end plate includes a first band body protruding from a main surface of the end plate on an upper end side of the end plate, and a second band body protruding from the main surface of the end plate in a middle of the end plate, and a space is formed in the second band body between the second band body and the main surface of the end plate.

According to the above configuration, the end plates having low rigidity near the middle and high rigidity on the upper end side sandwich the battery stack. Thus, by allowing a central portion of the secondary battery cell to expand while suppressing expansion of the secondary battery cell near a sealing body, a load on the fastening member and the end plates can be reduced.

Further, the end plate may have a third band body protruding from the main surface of the end plate on a lower end side of the end plate. With the above configuration, it is possible to suppress deformation of a lower end side of the secondary battery cell located on the end surface of the battery stack.

Further, a thickness of the second band body may be formed thinner than a thickness of the first band body. With the above configuration, deformation of the central portion of the secondary battery cell located on the end surface of the battery stack is further allowed, and stress of entire deformation can be relieved.

Further, the first band body and the third band body each may have a shape with a central portion protruded. With the above configuration, it is possible to suppress deformation of an upper surface and a bottom surface of the secondary battery cell located on the end surface of the battery stack and protect the secondary battery cell.

Furthermore, a first through hole for fixing the fastening member may be provided in the first band body and the third band body.

Furthermore, the end plate may be made of an iron-based material, aluminum, an aluminum alloy, a resin, or the like that can be molded using a mold. With the above configuration, rigidity of the end plate can be increased.

Furthermore, a hole may be formed on an upper end surface of the end plate. With the above configuration, weight reduction can be achieved.

Furthermore, a hole may be formed on a lower end surface of the end plate. With the above configuration, weight reduction can be achieved.

A vehicle according to one exemplary embodiment of the present invention includes: the power supply device; a traveling motor supplied with electric power from the power supply device; a vehicle body formed by mounting the power supply device and the motor; and wheels driven by the motor to cause the vehicle body to travel.

An end plate according to one exemplary embodiment of the present invention is an end plate for sandwiching, in a state where a plurality of secondary battery cells having electrode terminals is stacked, a stack of the stacked secondary battery cells, the end plate including: a first band body protruding from a main surface of the end plate on an upper end side of the end plate; and a second band body protruding from the main surface of the end plate in a middle of the end plate, wherein a space is formed in the second band body between the second band body and the main surface of the end plate. According to the above configuration, the end plates having low rigidity near the middle and high rigidity on the upper end side sandwich the battery stack. Thus, by allowing a central portion of the secondary battery cell to expand while suppressing expansion of the secondary battery cell near a sealing body, a load on the fastening member and the end plates can be reduced.

An exemplary embodiment of the present invention is described below with reference to the drawings. However, the exemplary embodiment described below is an example for embodying the technical idea of the present invention, and the present invention is not limited to the following. Further, in the present description, members shown in the scope of claims are not limited to the members of the exemplary embodiment. Especially, it is not intended that the scope of the present invention be limited only to the sizes, materials, and shapes of components and relative arrangement between the components described in the exemplary embodiment unless otherwise specified. The sizes and the like are mere explanation examples. The sizes and the positional relation of the members in each drawing are sometimes exaggerated for clearing the explanation. Furthermore, in the following explanation, the same names or the same reference marks denote the same members or same-material members, and detailed description is appropriately omitted. Furthermore, regarding the elements constituting the present invention, a plurality of elements may be formed of the same member, and one member may serve as the plurality of elements. Conversely, the function of one member may be shared by the plurality of members.

The power supply device according to the exemplary embodiment is used for various applications, such as a power supply mounted on an electric vehicle such as a hybrid car or an electric car to supply power to a traveling motor, a power supply that stores generated power of natural energy such as solar power generation or wind power generation, or a power supply that stores midnight power, and is particularly used as a power supply suitable for large power and large current applications.

[First Exemplary Embodiment]

Figure 2:
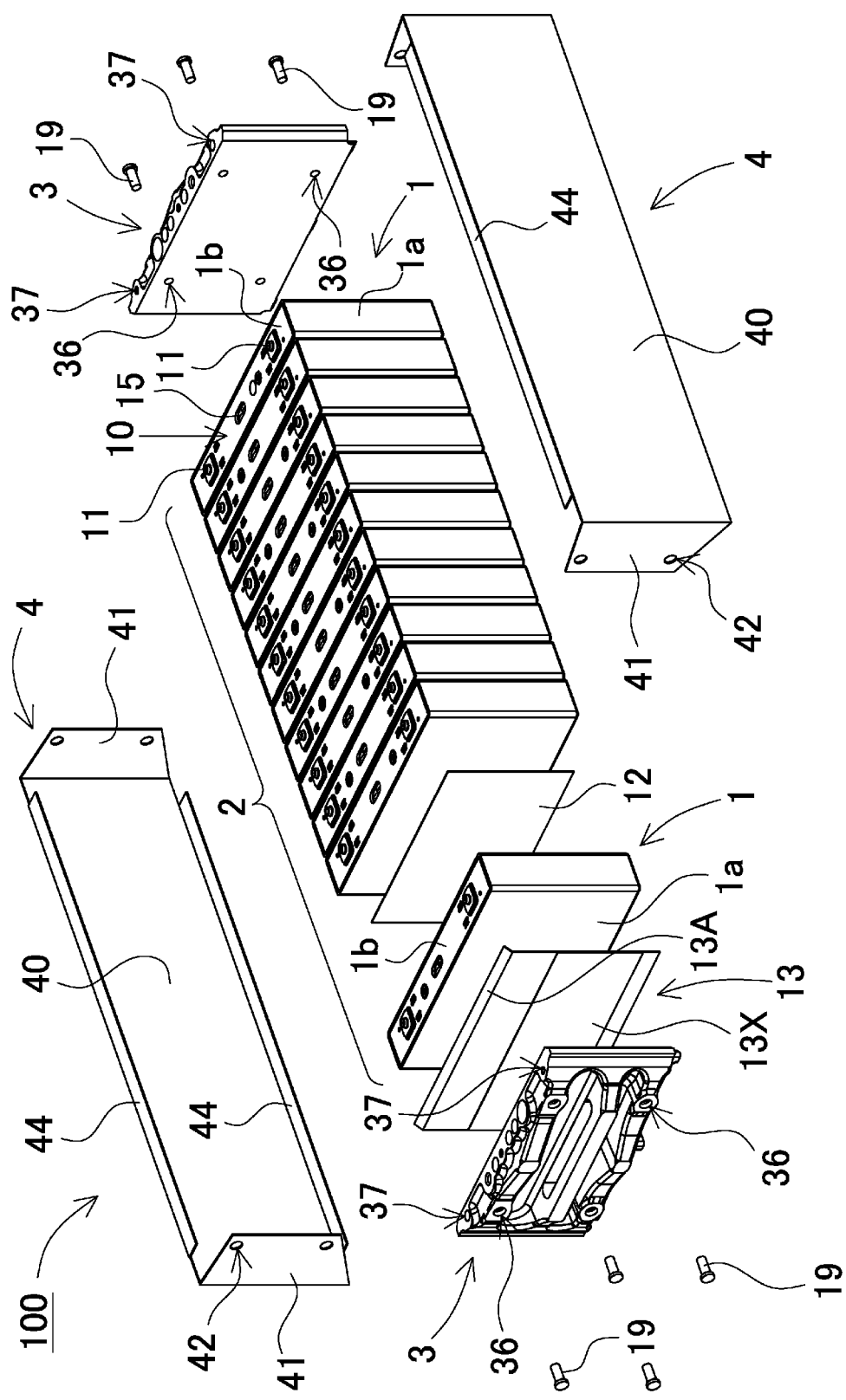
FIG. 2 is an exploded perspective view of the power supply device shown in FIG. 1.

FIG. 1 shows a perspective view of power supply device 100 according to a first exemplary embodiment of the present invention, and FIG. 2 shows an exploded perspective view of power supply device 100. Power supply device 100 shown in these drawings includes battery stack 2 in which a plurality of secondary battery cells 1 is stacked, a pair of end plates 3 disposed at both ends of this battery stack 2, a pair of fastening members 4 having both ends connected to the pair of end plates 3 and fastening battery stack 2. Further, in power supply device 100, fastening member 4 includes main body 40 disposed along a side surface of battery stack 2 and fixing part 41 bent at each end of this main body 40 and fixed to an outer surface of end plate 3.

(Secondary Battery Cell 1)

As shown in FIG. 2, secondary battery cell 1 is a prismatic (=rectangular) battery having a width wider than a thickness, that is, having a thickness thinner than a width, and secondary battery cells 1 are stacked in a thickness direction to form battery stack 2. Secondary battery cell 1 is a lithium ion secondary battery. However, secondary battery cell can also be any rechargeable secondary battery such as a nickel metal hydride battery or a nickel cadmium battery. Secondary battery cell 1 has positive and negative electrode plates together with an electrolyte solution housed in exterior can 1$a$ having a closed structure. Exterior can 1$a$ is formed by pressing a metal plate such as aluminum or an aluminum alloy into a rectangular shape, and hermetically seals an opening with sealing plate 1$b$. Sealing plate 1$b$ is made of the same aluminum or aluminum alloy as exterior can 1$a$, and has positive and negative electrode terminals 11 fixed to both ends. Further, sealing plate 1$b$ is provided with gas discharge valve 15 between positive and negative electrode terminals 11.

The plurality of secondary battery cells 1 is stacked so that the thickness direction of each secondary battery cell 1 is a stacking direction to form battery stack 2. In secondary battery cells 1, terminal surfaces 10 provided with positive and negative electrode terminals 11 are disposed on an identical plane, and the plurality of secondary battery cells 1 is stacked to form battery stack 2.

(Separator 12)

As shown in FIG. 2, battery stack 2 has separator 12 sandwiched between stacked secondary battery cells 1. Separator 12 in the drawing is made of an insulating material in a form of a thin plate or sheet. Separator 12 shown in the drawing has a plate form having a size substantially equal to a size of a facing surface of secondary battery cell 1, and this separator 12 is stacked between secondary battery cells 1 adjacent to each other to insulate adjacent secondary battery cells 1. Note that, although not shown, separator 12 may have a shape in which a cooling gas passage is formed between secondary battery cell 1 and a spacer. Further, surfaces of secondary battery cell 1 can be covered with an insulating material. For example, surfaces of exterior can 1a excluding electrode portions of the secondary battery cell may be heat-welded with a shrink tube of polyethylene terephthalate (PET) resin or the like.

(Battery Stack 2)

In battery stack 2, a metal bus bar is connected to positive and negative electrode terminals 11 of adjacent secondary battery cells 1, and the plurality of secondary battery cells 1 is connected in series or in parallel or in series and in parallel through the bus bar. Battery stack 2 shown in the drawing has twelve secondary battery cells 1 connected in series. However, the present invention does not specify a number and a connection state of secondary battery cells 1 forming the battery stack.

(End Surface Spacer 13)

End plates 3 are disposed on both end surfaces of battery stack 2 with end surface spacers 13 sandwiched between end plates 3 and battery stack 2. As shown in FIG. 2, end surface spacer 13 is disposed between battery stack 2 and end plate 3 to insulate end plate 3 from battery stack 2. End surface spacer 13 can be made of a material similar to the material of separator 12 described above. End surface spacer 13 shown in the drawing includes plate 13X having a size capable of covering the entire facing surface of secondary battery cell 1, and this plate 13X is stacked between secondary battery cell 1 and end plate 3 disposed at both the ends of battery stack 2.

Further, end surface spacer 13 of FIG. 2 is provided with terminal surface cover 13A that covers terminal surface 10 of secondary battery cell 1 connected to an upper edge of plate 13X. End surface spacer 13 of FIG. 2 is provided with terminal surface cover 13A that protrudes to secondary battery cell 1 side over the entire upper edge of plate 13X. In this way, a structure in which terminal surface cover 13A is provided over the entire upper edge of plate 13X can improve insulation characteristics by reliably covering terminal surface 10 which is an upper surface of secondary battery cell 1, while ensuring an insulation distance between end plate 3 and battery stack 2.

(End Plate 3)

As shown in FIGS. 1 and 2, end plates 3 are disposed at both the ends of battery stack 2 and are fastened via fastening members 4 disposed along both side surfaces of battery stack 2. End plates 3 are disposed at both the ends of battery stack 2 in the stacking direction of secondary battery cells 1 and outside end surface spacers 13, and sandwich battery stack 2 from both the ends. In each end plate, rigidity at an upper end portion can be made higher than rigidity at a central portion.

End plate 3 has a quadrangular outer shape, and is disposed so as to face the end surface of battery stack 2. End plate 3 shown in FIGS. 1 and 2 has an outer shape that is substantially identical to an outer shape of secondary battery cell 1. In other words, end plate 3 shown in the drawing has a width in a left-right direction equal to the width of secondary battery cell 1 and a height in an up-down direction equal to a height of secondary battery cell 1. Note that, in this specification, the up-down direction is an up-down direction in the drawing, and the left-right direction is a left-right direction in the drawing and means a horizontal direction orthogonal to the stacking direction of the batteries.

Further, end plate 3 shown in FIG. 2 has a plurality of through holes for fixing end plate 3. For example, end plate 3 has first through hole 36 for inserting fastener 19 that fixes fixing part 41 of fastening member 4. End plate 3 shown in the drawing has a plurality of through holes as first through holes 36. End plate 3 shown in the drawing is provided with the plurality of first through holes 36 vertically separated from each other on both sides at positions facing fixing part 41. End plate 3 shown in FIG. 2 is provided with a total of six first through holes 36, three on each side. In this end plate 3, fastener 19 penetrating fixing part 41 disposed on an outer peripheral surface is inserted into first through hole 36. Fastener 19 inserted into first through hole 36 is fixed to first through hole 36 and fixes fixing part 41 at a fixed position.

Furthermore, end plate 3 has, as second through hole 37 different from first through hole 36, a through hole for inserting a bolt that fixes the power supply device to a fixed part (for example, a vehicle in a case of a vehicle-mounted power supply device). Second through holes 37 are formed as vertical holes at both ends on an upper surface of end plate 3.

(Fastener 19)

Fastener 19 is fixed to first through hole 36 so as not to come off. As such fastener 19, a set screw, a bolt, a rivet, or the like can be used. The fastener which is the set screw or the bolt is screwed into and fixed to first through hole 36 when the fastener is inserted into first through hole 36. Therefore, first through hole 36, to which the fastener such as the set screw or the bolt is fixed, can be provided with a female screw on an inner surface that meshes with a male screw of the set screw or the bolt. The fastener which is the rivet is inserted into first through hole 36 of end plate 3 in a state of penetrating the fixing part, and one end of the fastener is crimped inside first through hole 36 to fix end plate 3 and the fixing part. The fastener which is the rivet fixes the fixing part to end plate 3 by clamping first through hole 36 of end plate 3 and an opening edge of a through hole of the fixing part by a caulking part formed inside first through hole 36 of end plate 3. First through hole 36 into which the rivet is inserted can have an inner shape in which a head of the rivet cannot pass through by decreasing an opening area on an outer surface, and can arrange the caulking part formed by deforming the rivet inside by increasing an opening area on a facing surface side which is an opposite side.

(Fastening Member 4)

As shown in FIGS. 1 and 2, fastening member 4 is extended in the stacking direction of battery stack 2, has both ends fixed to end plates 3 disposed on both the end surfaces of battery stack 2, and fastens battery stack 2 in the stacking direction via this end plate 3. Fastening member 4 is a metal plate having a predetermined width and a predetermined thickness along the side surface of battery stack 2, and is disposed to face each side surface of battery stack 2. For this fastening member 4, a metal plate such as iron, preferably a steel plate, can be used. Fastening member 4 made of the metal plate is bent into a predetermined shape by press forming or the like.

Fastening member 4 includes main body 40 disposed along the side surface of battery stack 2 and fixing part 41 bent at each end of this main body 40 and fixed to the outer surface of end plate 3. Main body 40 has a rectangular shape having a size that covers almost entire battery stack 2 and end plates 3 disposed at both ends of battery stack 2. Main body 40 shown in FIG. 1 covers almost the entire side surface of battery stack 2 with no gaps. However, main body 40 can also be provided with one or more openings to expose a part of the side surface of the battery stack. In order to fix both the ends of fastening member 4 to the pair of end plates 3, both the ends of fastening member 4 are bent along the outer surfaces of end plates 3 to provide fixing parts 41. Fixing part 41 shown in the drawing has a height substantially equal to a height of main body 40 or end plate 3 in the up-down direction, and fixing parts 41 cover both left and right sides of end plate 3. This fastening member 4 is fixed to end plate 3 via fastener 19 inserted into through hole 42 provided at a tip of fixing part 41. Further, fastening member 4 shown in the drawing includes bent parts 44 that hold an upper surface and a lower surface of battery stack 2 along an upper end of a middle portion excluding both the ends of main body 40. Bent parts 44 hold the upper surfaces and lower surfaces of secondary battery cells 1 forming battery stack 2, and prevents a position of terminal surface 10 of each secondary battery cell 1 from being vertically displaced.

Note that, although not shown, fastening member 4 includes an insulating sheet disposed on the inner surfaces of main body 40 and bent parts 44, and this insulating sheet can insulate secondary battery cells 1 of battery stack 2 and fastening member 4 from each other. Further, although not shown, fastening member 4 can be provided with a cushioning material on inner surfaces of both ends of main body 40 to protect both side surfaces of end plate 3 from shock such as vibration.

(Band Body)

Figure 3:
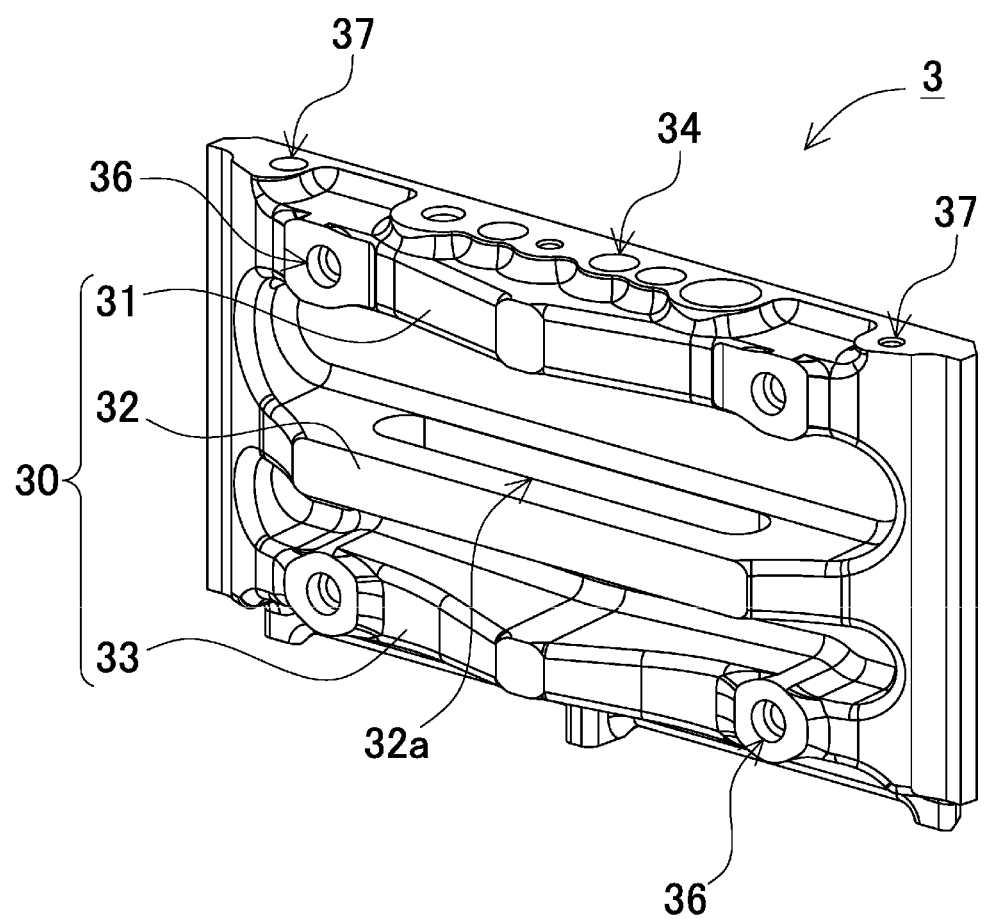
FIG. 3 is a perspective view of an end plate shown in FIG. 1.

FIG. 3 shows a perspective view of end plate 3. End plate 3 shown in this drawing includes a plurality of band bodies 30. In middle band body 30, a space is formed between middle band body 30 and a surface of end plate 3. End plate 3 having such a shape can be molded using, for example, a mold and a core which is a sand mold. Note that end plate 3 is preferably made of a material such as an iron-based material, aluminum, an aluminum alloy, a resin, or the like so that end plate 3 can be molded with the mold.

Figure 4:
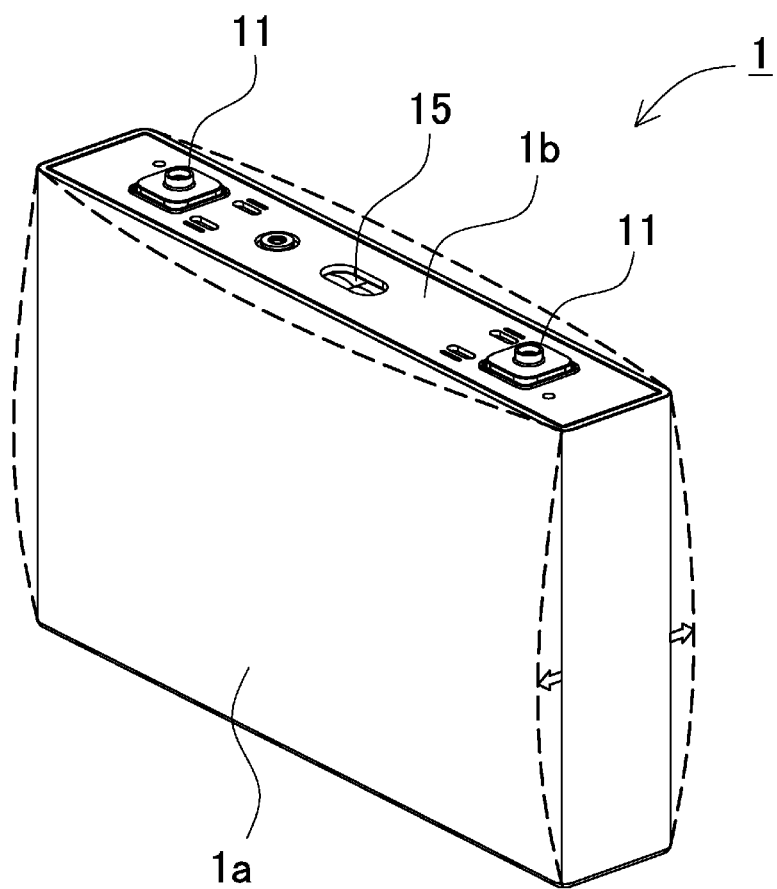
FIG. 4 is a perspective view showing how a secondary battery cell expands.
Figure 5:
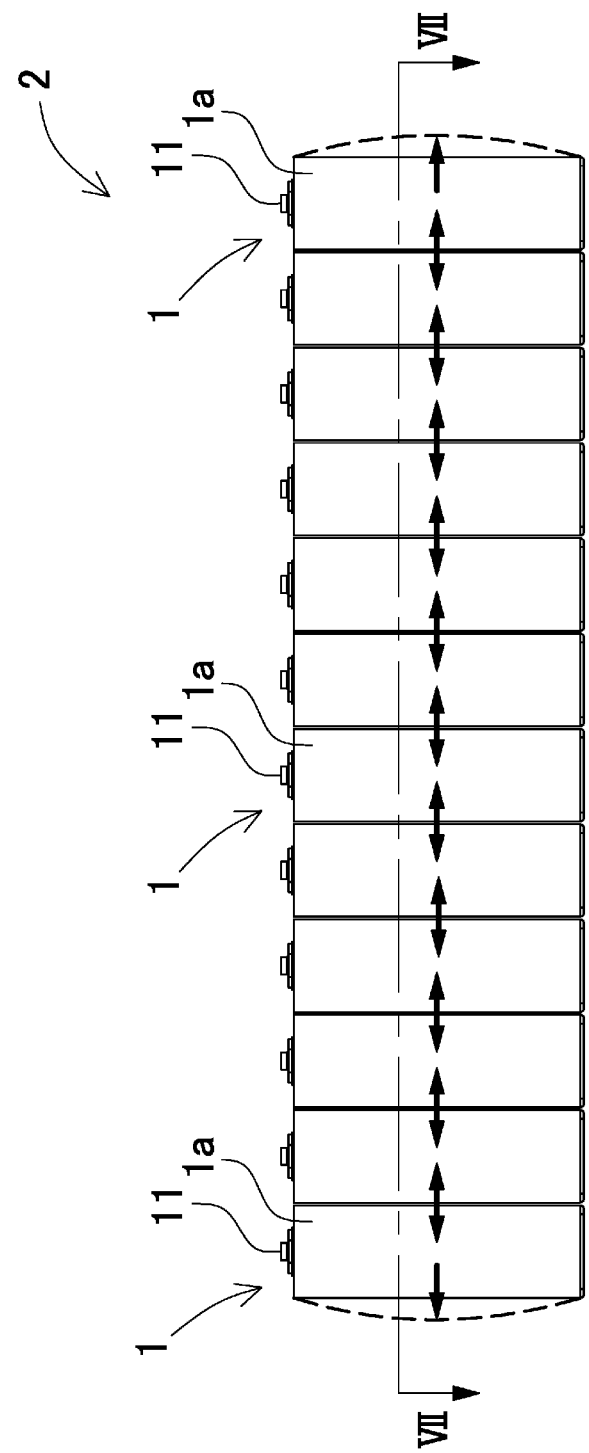
FIG. 5 is a side view showing how a battery stack expands.

End plate 3 needs to suppress expansion of a secondary battery cell. The secondary battery cell expands due to charge and discharge, as shown by broken lines and arrows in a perspective view of FIG. 4. When exterior can 1a of the secondary battery cell expands, there is concern that a welded portion between exterior can 1a and sealing plate 1b that seals the opening of this exterior can 1a may come off. Here, considering battery stack 2 in which the prismatic secondary battery cells are stacked, as shown in a side view of FIG. 5, in a middle portion of battery stack 2, facing surfaces of exterior cans 1a are pressed against each other between the adjacent secondary battery cells, so that stress of expansion is offset and relieved. On the other hand, on outer surfaces of exterior cans 1a of the secondary battery cells located on the end surfaces of battery stack 2, the stress of expansion works because there are no facing secondary battery cells. As shown in FIG. 4, it is necessary to protect the welded portion between exterior can 1a and sealing plate 1b.

Figure 6:
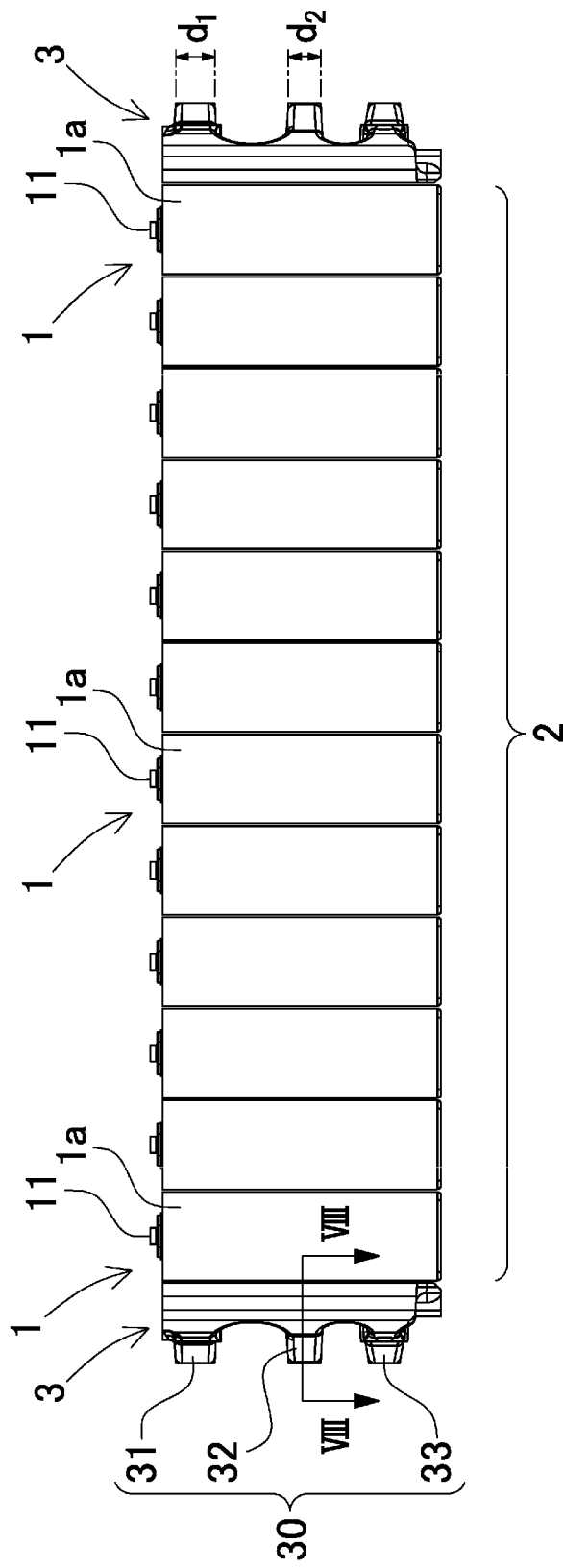
FIG. 6 is a side view showing a state where the battery stack of FIG. 5 is sandwiched by the end plates.

Therefore, as shown in a side view of FIG. 6, end plate 3 according to the present exemplary embodiment has the plurality of band bodies 30 added to end plate 3. Each band body 30 is formed so as to protrude from a main surface of end plate 3 in a substantially orthogonal posture. In an example of FIG. 6, first band body 31 is formed on an upper end side of end plate 3, second band body 32 is formed in a middle of end plate 3, and third band body 33 is formed on a lower end side of end plate 3. These band bodies 30 are formed integrally with end plate 3.

In this way, by providing first band body 31 and second band body 32 in portions, of the main surface of end plate 3, facing an upper surface and a lower surface of exterior can 1a, deformation of end plate 3 is suppressed by being stretched at a connection portion between first band body 31 and end plate 3. Accordingly, it is possible to suppress expansion of secondary battery cell 1 disposed on the end surface of battery stack 2, and to protect a connection interface between exterior can 1a and sealing plate 1b of this secondary battery cell 1. Further, also regarding a bottom surface of exterior can 1a, third band body 33 can similarly protect the bottom surface of exterior can 1a.

Further, it is preferable that first band body 31 and third band body 33 each have a shape with a center protruded in a plan view. In particular, on the upper surface of secondary battery cell 1, by forming a central portion of the band body thick so that deformation of the central portion is suppressed, rigidity can be increased. In an example shown in FIG. 3, first band body 31 and third band body 33 are formed into isosceles triangles. Further, vertices of the isosceles triangles are chamfered to prevent end plate 3 from increasing in size.

Furthermore, it is preferable to provide first band body 31 and third band body 33 with first through hole 36 for inserting fastener 19 that fixes fixing part 41 of fastening member 4. As described above, by using first band body 31 and third band body 33 that are thickly formed on the surface of end plate 3 to form first through hole 36 for fastening fastening member 4, strength of first through hole 36 can be increased.

Figure 7:
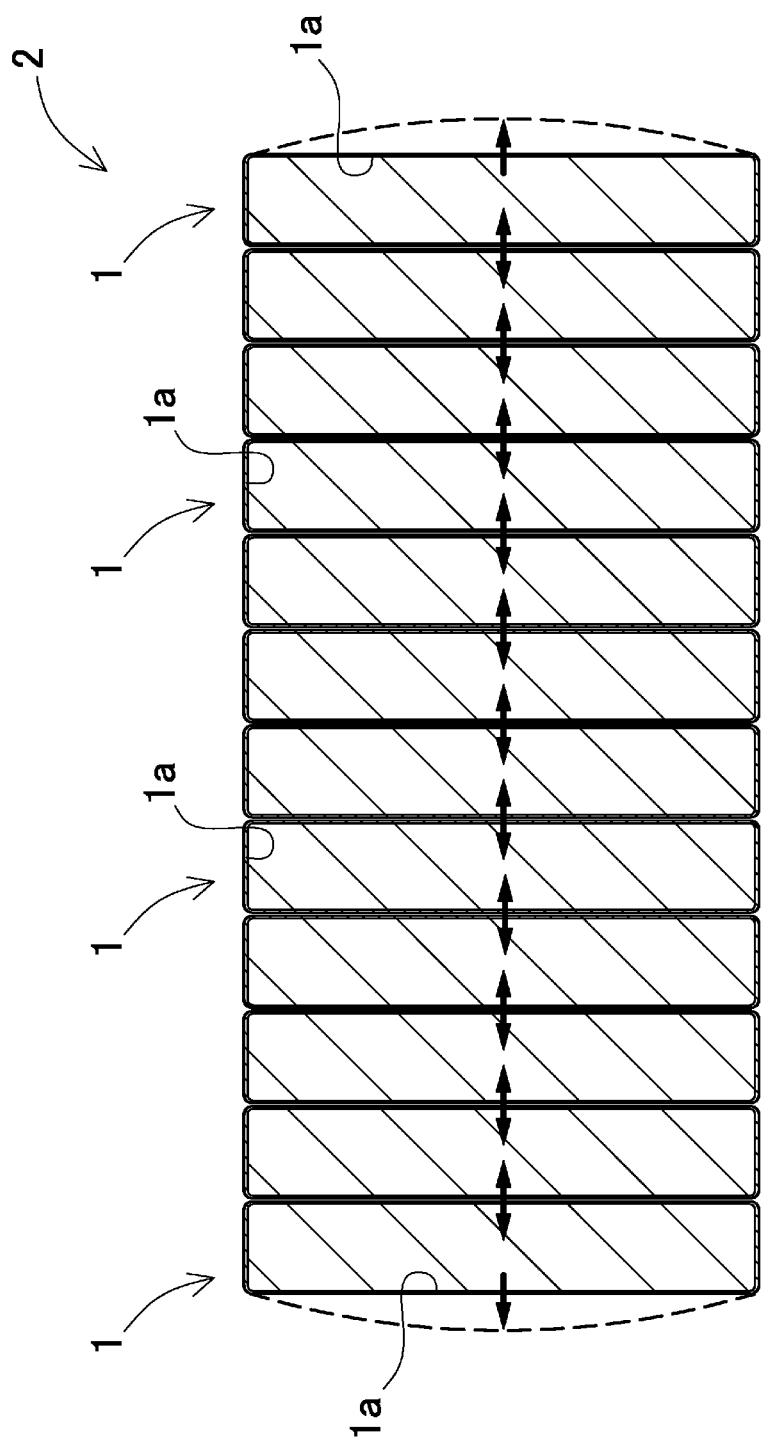
FIG. 7 is a horizontal sectional view taken along line VII-VII in FIG. 5.
Figure 8:
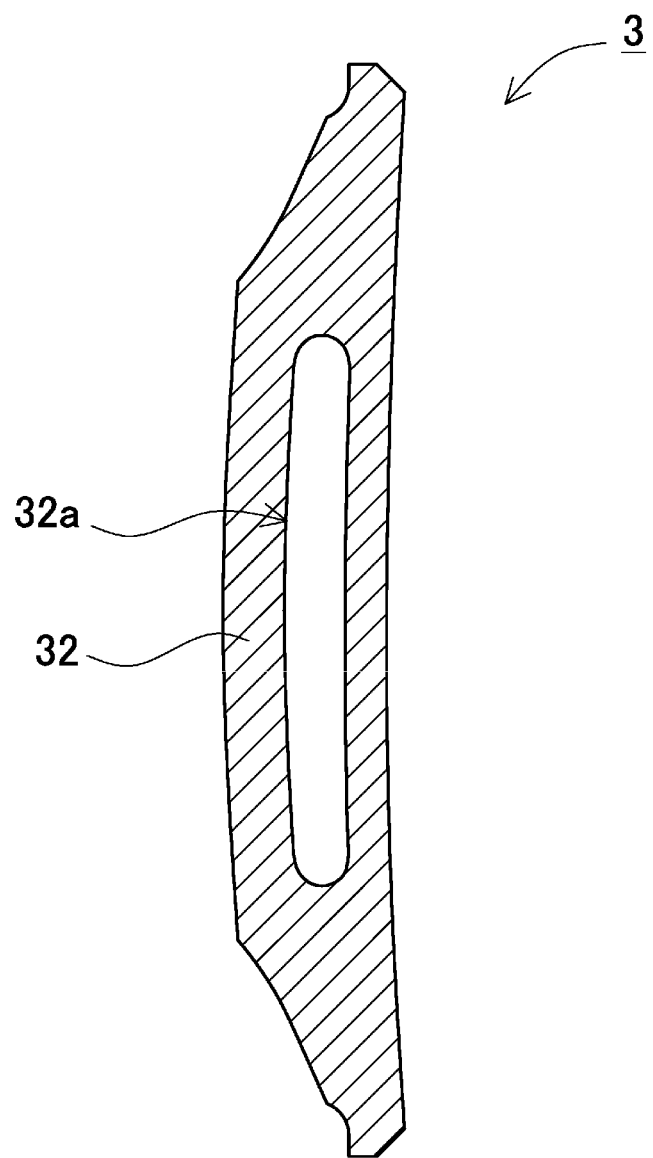
FIG. 8 is a horizontal sectional view taken along line VIII-VIII in FIG. 5.

On the other hand, expansion may be allowed in a portion of exterior can 1a other than the connection interface with sealing plate 1b and the bottom surface, that is, a middle region. Here, FIG. 7 is a horizontal sectional view taken along line VII-VII of battery stack 2 in FIG. 5. As shown in this drawing, as a result of expansion of secondary battery cells 1 as shown by broken lines and arrows, also in a horizontal cross section, exterior cans 1a of secondary battery cells 1 disposed on the end surfaces of battery stack 2 expand. In this portion, even if exterior can 1a is deformed, there is little trouble. Therefore, in second band body 32 provided in the middle, space 32a is formed as shown in a horizontal sectional view of FIG. 8. In other words, second band body 32 is formed in a U shape in a plan view. With such a shape, an expanded belly portion of exterior can 1a can be deformed so as to enter space 32a. In other words, of the deformation of exterior can 1a, by allowing deformation of the middle belly portion while suppressing deformation near the upper surface side and the lower surface side, an effect of relieving stress can be obtained by making stress to be deformed escape to the middle region.

Further, it is preferable that second band body 32 have thickness d2 thinner than thickness d1 of first band body 31, as shown in FIG. 6. By doing so, with respect to secondary battery cell 1 located on the end surface of battery stack 2, pressing force at the central portion is relatively decreased compared to pressing force at the upper surface and the lower surface, and deformation can be allowed. In other words, by intentionally decreasing rigidity of the band body in the central portion to prevent stress from concentrating on the upper and lower surfaces and to make the stress escape to the center, the upper and lower surfaces can be protected. Further, by making second band body 32 thin, weight of second band body 32 is reduced in combination with the formation of space 32a, and the weight of end plate 3 is reduced.

Note that the above configuration is merely an example for realizing protection of the secondary battery cells located on the end surfaces of the battery stack while suppressing expansion of the secondary battery cells. In order to achieve the above object, it is particularly important to provide an end plate in which rigidity of an upper end portion is high and rigidity of a central portion is low. Depending on rigidity and strength of end plate 3, for example, it is also possible to have a configuration in which second band body 32 is eliminated and deformation is received only by a plane.

Further, as shown in the perspective view of FIG. 3, end plate 3 preferably has hole 34 formed in the upper end surface in accordance with required strength and rigidity. For example, when the rigidity of the upper end portion is too high, stress can be concentrated on other portions of the end plate. Therefore, from the viewpoint of the strength of the end plate, it is not necessarily good that the rigidity of the upper end portion is higher. In the above configuration, hole 34 is formed on the upper end surface to balance the rigidity. Note that, unlike space 32a formed by second band body 32, hole 34 is not intended to allow expansion of secondary battery cell 1 at the upper end portion. Therefore, hole 34 is a space smaller than space 32a formed by second band body 32. Further, although not shown, a hole may be formed on the upper end surface depending on the required strength and rigidity. The formation of the hole can further reduce the weight.

The above power supply device can be used as a vehicle-mounted power supply. As a vehicle equipped with the power supply device, there are electric vehicle such as a hybrid car or a plug-in hybrid car that runs with both an engine and a motor and an electric car that runs only with a motor. The power supply device is used as a power supply for these electric vehicles. Note that large-capacity, high-output power supply device 1000 in which a large number of the above-described power supply devices are connected in series or in parallel in order to obtain electric power for driving a vehicle and to which a necessary control circuit is further added will be described as a constructed example.

(Power Supply Device for Hybrid Car)

Figure 9:
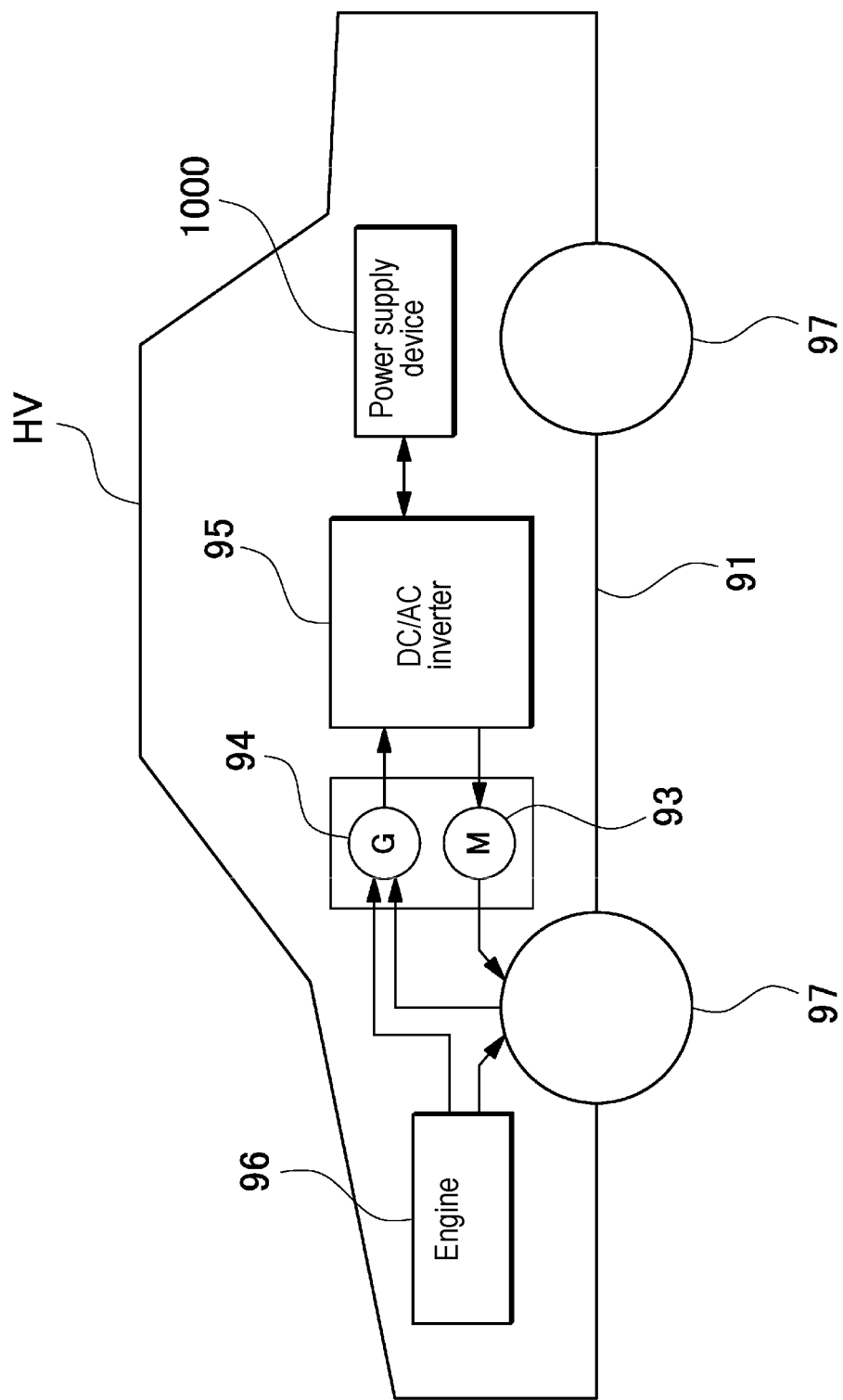
FIG. 9 is a block diagram showing an example in which the power supply device is mounted on a hybrid car that runs with an engine and a motor.

FIG. 9 shows an example in which the power supply device is mounted on a hybrid car that runs with both an engine and a motor. Vehicle HV equipped with the power supply device shown in this drawing includes vehicle body 91, engine 96 and traveling motor 93 that cause this vehicle body 91 to travel, wheels 97 driven by these engine 96 and traveling motor 93, power supply device 1000 that supplies electric power to motor 93, and generator 94 that charges batteries of power supply device 1000. Power supply device 1000 is connected to motor 93 and generator 94 via DC/AC inverter 95. Vehicle HV runs with both motor 93 and engine 96 while charging and discharging batteries of power supply device 1000. Motor 93 causes the vehicle to travel by being driven in a region where engine efficiency is low, for example, during acceleration or low speed traveling. Motor 93 is driven by the electric power supplied from power supply device 1000. Generator 94 is driven by engine 96 or by regenerative braking during braking of the vehicle to charge the batteries of power supply device 1000.

(Power Supply Device for Electric Car)

Figure 10:
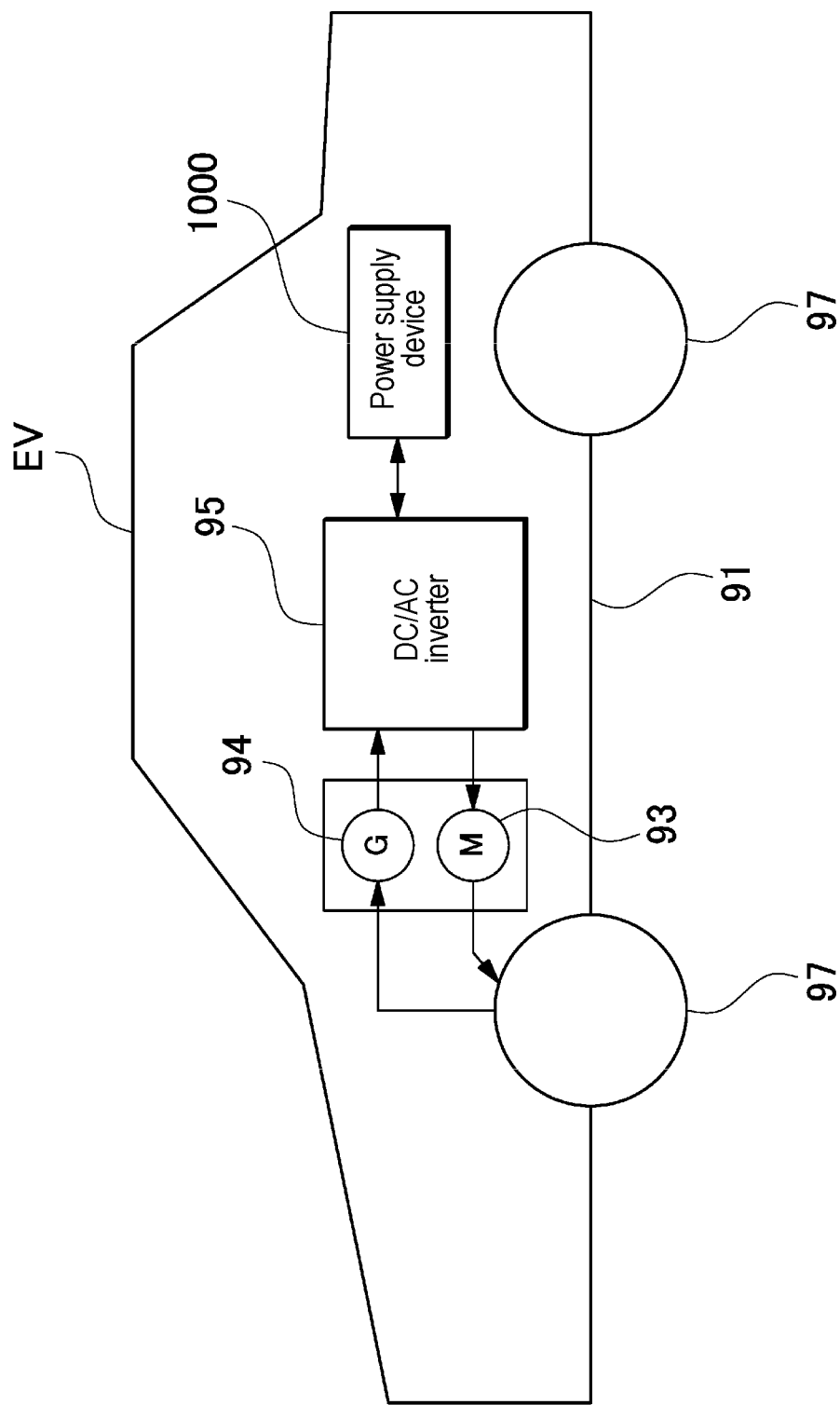
FIG. 10 is a block diagram showing an example in which the power supply device is mounted on an electric car that runs only with a motor.

Further, FIG. 10 shows an example in which the power supply device is mounted on an electric car that runs only with a motor. Vehicle EV equipped with the power supply device shown in this drawing includes vehicle body 91, traveling motor 93 that causes this vehicle body 91 to travel, wheels 97 driven by this motor 93, power supply device 1000 that supplies electric power to this motor 93, and generator 94 that charges batteries of this power supply device 1000. Power supply device 100 is connected to motor 93 and generator 94 via DC/AC inverter 95. Motor 93 is driven by the electric power supplied from power supply device 1000. Generator 94 is driven by energy when regenerative braking is applied to vehicle EV to charge the batteries of power supply device 1000.

(Power Storage System)

Figure 11:
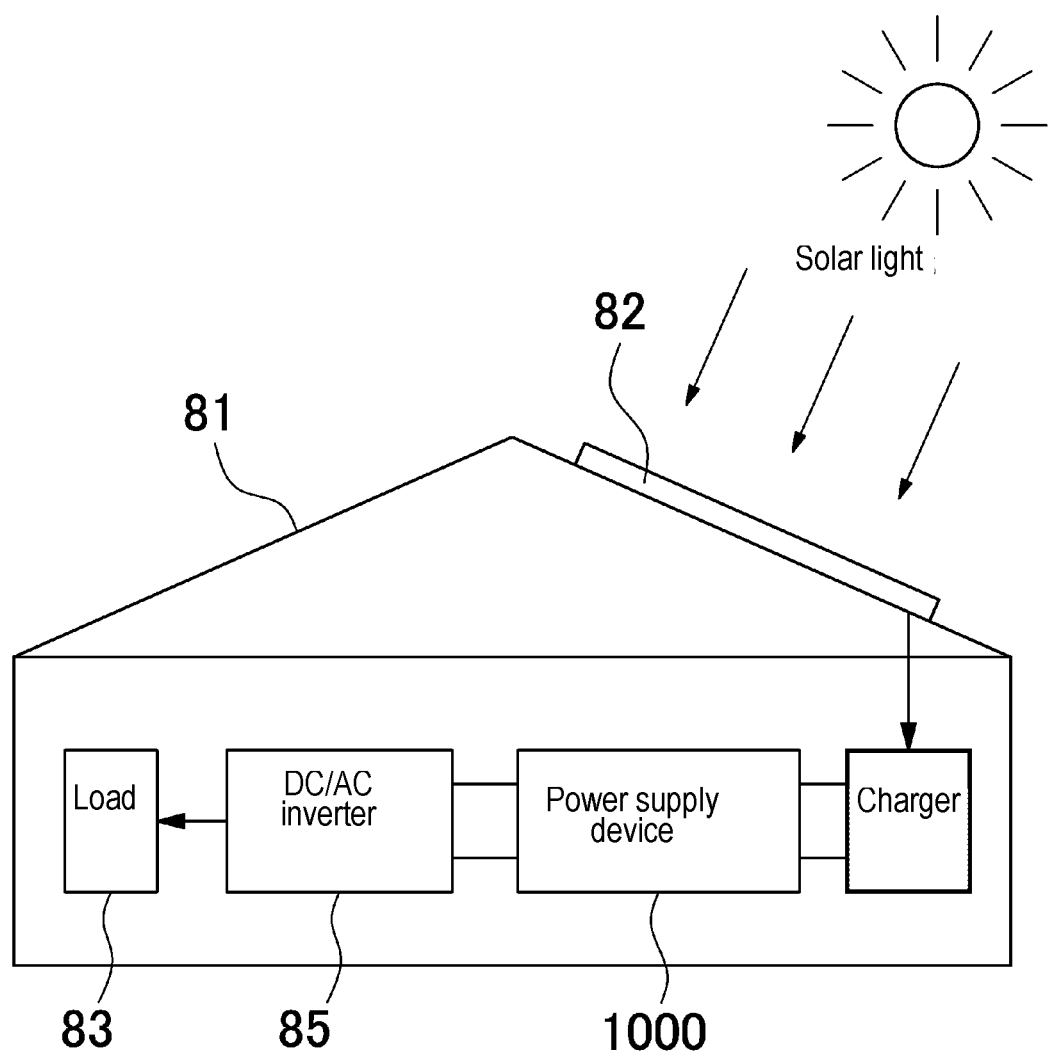
FIG. 11 is a block diagram showing an example applied to a power supply device for power storage.

Furthermore, the present invention does not specify the use of the power supply device as the power supply of the motor that causes the vehicle to travel. The power supply device according to the exemplary embodiment can also be used as a power supply of a power storage system that charges and stores batteries with electric power generated by solar power generation, wind power generation, or the like. FIG. 11 shows a power storage system in which batteries of power supply device 1000 are charged by a solar cell to store power. As shown in the drawing, the power storage system shown in this drawing charges the batteries of power supply device 100 with electric power generated by solar cell 82 disposed on a roof or rooftop of building 81 such as a house or factory. Furthermore, this power storage system supplies the power stored in power supply device 100 to load 83 via DC/AC inverter 85.

Further, although not shown, the power supply device can also be used as a power supply of a power storage system that charges and stores batteries by using midnight power at night. The power supply device charged with the midnight power can be charged with the midnight power that is surplus power of a power plant, output the power during daytime when a power load increases, and limit peak power during the daytime to a small value. Furthermore, the power supply device can also be used as a power supply that charges both an output of a solar cell and midnight power. This power supply device can effectively store both electric power generated by the solar cell and midnight power, and can efficiently store power in consideration of weather and power consumption.

The power storage system as described above can be suitably used for applications, such as a backup power supply device that can be installed in a computer server rack, a backup power supply device for a mobile phone wireless base station, a power storage power supply for a household or a factory, a street light power supply, a power storage apparatus combined with a solar cell, and a backup power supply for traffic lights and traffic indicators for roads.

INDUSTRIAL APPLICABILITY

A power supply device cooling method, a cooling program, a computer-readable recording medium and a stored device, a power supply device, and a vehicle provided with the power supply device according to the present invention can be suitably used as a power supply for large current used for a power supply of a motor that drives an electric vehicle such as a hybrid car, a fuel cell car, an electric car, and an electric motorcycle. For example, a power supply device for a plug-in hybrid electric car or a hybrid electric car that can be switched between an EV traveling mode and an HEV traveling mode, and for an electric car can be mentioned. Further, the power supply device can also be appropriately used for applications, such as a backup power supply device that can be installed in a computer server rack, a backup power supply device for a mobile phone wireless base station, a power storage power supply for a household or a factory, a street light power supply, a power storage apparatus combined with a solar cell, a backup power supply for a traffic light.

The invention claimed is:
1. A power supply device comprising:
a plurality of secondary battery cells;

a pair of end plates that are disposed on end surfaces of a battery stack obtained by connecting the plurality of secondary battery cells, and sandwich the battery stack; and a fastening member for fixing the pair of end plates to each other, wherein each of the pair of end plates includes a first band body protruding from a main surface of each of the pair of end plates on an upper end side of each of the pair of end plates, and a second band body protruding from the main surface of each of the pair of end plates in a middle of each of the pair of end plates, and a space is formed in the second band body between the second band body and the main surface of each of the pair of end plates, wherein the first band body is configured to exhibit a first rigidity, and the second band body is configured to exhibit a second rigidity lower than the first rigidity, wherein the first band body overlaps the end surfaces of the battery stack in a stacking direction of the plurality of secondary battery cells, wherein the first band body and the second band body are elongated in a first direction, and the space formed in the second band body comprises a through hole extending through the second band body in a second direction perpendicular to the first direction and to the stacking direction, and wherein each of the pair of end plates including the first band body and the second band body is a monolithically molded piece of material.

2. The power supply device according to claim 1, wherein each of the pair of end plates further includes a third band body protruding from the main surface of each of the pair of end plates on a lower end side of each of the pair of end plates.

3. The power supply device according to claim 2, wherein the first band body and the third band body each have a shape with a central portion protruded.

4. The power supply device according to claim 3, wherein a first through hole for fixing the fastening member is provided in each of the first band body and the third band body.

5. The power supply device according to claim 1, wherein a thickness of the second band body is thinner than a thickness of the first band body.

6. The power supply device according to claim 1, wherein each of the pair of end plates is made of any one of an iron-based material, aluminum, an aluminum alloy, and a resin, and can be molded using a mold.

7. The power supply device according to claim 1, wherein a hole is formed on an upper end surface of each of the pair of end plates.

8. The power supply device according to claim 1, wherein a hole is formed on a lower end surface of each of the pair of end plates.

9. A vehicle provided with the power supply device according to claim 1, the vehicle comprising:

the power supply device; a traveling motor supplied with electric power from the power supply device; a vehicle body formed by mounting the power supply device and the motor; and wheels driven by the motor to cause the vehicle body to travel.

10. The power supply device according to claim 1, wherein each of the pair of end plates has a height equal to a height of the plurality of secondary battery cells, wherein a top end adjacent to the first band body of each of the pair of end plates aligns with a top end of the end surfaces of the battery stack in a vertical direction.

11. An end plate for sandwiching, in a state where a plurality of secondary battery cells having electrode terminals are stacked, a stack of the plurality of secondary battery cells stacked, the end plate comprising:

a first band body protruding from a main surface of the end plate on an upper end side of the end plate; and a second band body protruding from the main surface of the end plate in a middle of the end plate, wherein a space is formed in the second band body between the second band body and the main surface of the end plate, wherein the first band body is configured to exhibit a first rigidity, and the second band body is configured to exhibit a second rigidity lower than the first rigidity, wherein the first band body overlaps the end surfaces of the battery stack in a stacking direction of the plurality of secondary battery cells, wherein the first band body and the second band body are elongated in a first direction, and the space formed in the second band body comprises a through hole extending through the second band body in a second direction perpendicular to the first direction and to the stacking direction, and wherein each of the pair of end plates including the first band body and the second band body is a monolithically molded piece of material.

12. The end plate according to claim 11, wherein each of the pair of end plates has a height equal to a height of the plurality of secondary battery cells, wherein a top end adjacent to the first band body of each of the pair of end plates is configured to align with a top end of the end surfaces of the battery stack in a vertical direction.

* * * * *